US010609605B2

(12) United States Patent
Shan et al.

(10) Patent No.: US 10,609,605 B2
(45) Date of Patent: Mar. 31, 2020

(54) TRANSCODING AVOIDANCE DURING SINGLE RADIO VOICE CALL CONTINUITY (SRVCC)

(71) Applicant: INTEL CORPORATION, Santa Clara, CA (US)

(72) Inventors: Chang Hong Shan, Portland, OR (US); Alexandre Stojanovski, Paris (FR)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 16/204,877

(22) Filed: Nov. 29, 2018

(65) Prior Publication Data

US 2019/0110226 A1   Apr. 11, 2019

Related U.S. Application Data

(63) Continuation of application No. 15/423,288, filed as application No. PCT/US2015/045100 on Aug. 13, 2015, now Pat. No. 10,165,475.

(30) Foreign Application Priority Data

Sep. 5, 2014   (WO) ................ PCT/CN2014/085963

(51) Int. Cl.
*H04W 36/00* (2009.01)
*H04L 29/06* (2006.01)
(Continued)

(52) U.S. Cl.
CPC ....... *H04W 36/0022* (2013.01); *H04L 65/103* (2013.01); *H04L 65/1016* (2013.01);
(Continued)

(58) Field of Classification Search
CPC ............ H04W 36/0022; H04L 65/103; H04L 65/1016; H04L 65/80; H04M 7/0072; H04M 7/1225
(Continued)

(56) References Cited

U.S. PATENT DOCUMENTS

2009/0268635 A1   10/2009   Gallagher et al.
2012/0169825 A1   7/2012   Patel
(Continued)

FOREIGN PATENT DOCUMENTS

CN   101978727 A   2/2011
CN   102273264 A   12/2011
(Continued)

OTHER PUBLICATIONS

3GPP TS 23.216; "3$^{rd}$ Generation Partnership Project; Technical Specification Group Services and System Aspects; Single Radio Voice Call Continuity (SRVCC); Stage 2;" (Jun. 2014); 6 pages; V12.1.0 (Release 12).
(Continued)

*Primary Examiner* — Congvan Tran
(74) *Attorney, Agent, or Firm* — Thorpe North & Western

(57) ABSTRACT

Technology for transcoding avoidance is disclosed. A mobile switching center (MSC) server can decode a single radio voice call continuity (SRVCC) packet switch (PS) to circuit switched (CS) request message received from a mobility management entity (MME) that includes selected CODEC information for a selected CODEC used for a user equipment (UE) in an internet protocol (IP) Multimedia Subsystem (IMS) over long term evolution (LTE) system. The MSC server can encode the selected CODEC information for transmission to a target MSC to enable the target MSC to identify the selected CODEC for the UE to allow the selected CODEC to be used in the CS domain.

20 Claims, 7 Drawing Sheets

(51) Int. Cl.
  *H04M 7/00*   (2006.01)
  *H04M 7/12*   (2006.01)
(52) U.S. Cl.
  CPC .......... *H04L 65/80* (2013.01); *H04M 7/0072* (2013.01); *H04M 7/1225* (2013.01); *H04M 2242/04* (2013.01)
(58) Field of Classification Search
  USPC ....... 455/435.1, 436–439; 370/331–332, 328
  See application file for complete search history.

(56) References Cited

U.S. PATENT DOCUMENTS

| | | |
|---|---|---|
| 2013/0010752 A1 | 1/2013 | Rydnell et al. |
| 2013/0084860 A1 | 4/2013 | Wong et al. |
| 2013/0128865 A1 | 5/2013 | Wu et al. |
| 2013/0272194 A1 | 10/2013 | Keller et al. |
| 2015/0063299 A1* | 3/2015 | Keller ............... H04W 36/0022 370/331 |
| 2015/0156677 A1* | 6/2015 | Vedrine ............. H04W 36/0022 370/331 |
| 2016/0142447 A1 | 5/2016 | Mufti et al. |
| 2016/0183156 A1 | 6/2016 | Chin et al. |
| 2016/0381605 A1 | 12/2016 | Rydnell et al. |

FOREIGN PATENT DOCUMENTS

| | | |
|---|---|---|
| EP | 2787765 A1 | 10/2014 |
| JP | 2011234057 A | 11/2011 |
| WO | WO 2010052343 A2 | 5/2010 |
| WO | WO 2012006310 A1 | 1/2012 |
| WO | WO 2013080471 A1 | 6/2013 |

OTHER PUBLICATIONS

3GPP TS 23.228; "3rd Generation Partnership Project; Technical Specification Group Services and System Aspects; IP Multimedia Subsystem (IMS); Stage 2;" (Jun. 2014); 310 pages; V12.5.0 (Release 12).

3GPP TS 24.008; "3rd Generation Partnership Project; Technical Specification Group Core Network and Terminals; Mobile Radio Interface Layer 3 Specification; Core Network Protocols; Stage 3;" (Jun. 2014); 698 pages; V12.6.0 (Release 12).

3GPP TS 25.413; "3rd Generation Partnership Project; Technical Specification Group Radio Access Network; UTRAN Iu Interface Radio Access Network Application Part (RANAP) Signalling;" (Jun. 2014); 441 pages; V12.2.0 (Release 12).

* cited by examiner

TRANSCODING AVOIDANCE DURING SINGLE RADIO VOICE CALL CONTINUITY (SRVCC)

RELATED APPLICATIONS

This application is a continuation of U.S. application Ser. No. 15/423,288, filed Feb. 2, 2017, which is a 371 nationalization of PCT/US2015/045100, filed Aug. 13, 2015, which claims priority to PCT/CN2014/085963, filed Sep. 5, 2014, the entire specifications of which are hereby incorporated by reference in their entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure can be apparent from the detailed description which follows, taken in conjunction with the accompanying drawings, which together illustrate, by way of example, features of the disclosure; and, wherein.

Figure 1:
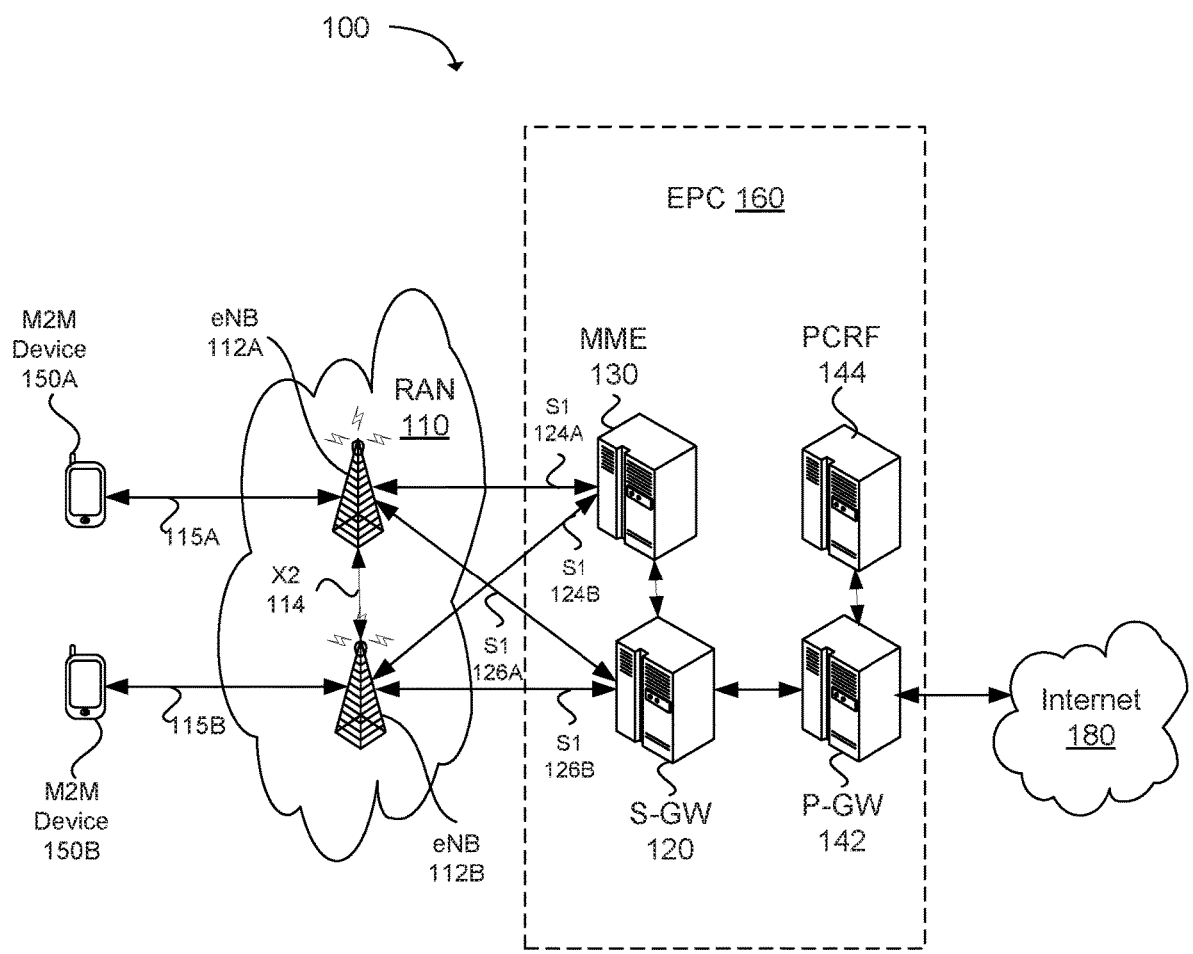
FIG. 1 illustrates a block diagram of a third generation partnership project (3GPP) wireless network in accordance with an example.

Reference can now be made to the exemplary examples illustrated, and specific language can be used herein to describe the same. It can nevertheless be understood that no limitation of the scope of the disclosure is thereby intended.

DETAILED DESCRIPTION

Before the present disclosure is disclosed and described, it is to be understood that this disclosure is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology examples is provided below and then specific technology examples are described in further detail later. This initial summary is intended to aid readers in understanding the technology more quickly but is not intended to identify key features or essential features of the technology nor is it intended to limit the scope of the claimed subject matter.

In an IP Multimedia Subsystem (IMS) service over a third generation partnership project (3GPP) long term evolution (LTE) configured system that supports a newly defined CODEC (e.g. enhanced voice services "EVS"), a single radio voice call continuity (SRVCC) procedure can cause additional transcoding between a target radio leg and an access transfer gateway (ATGW). This can occur when a user equipment (UE) moves from a network that supports 3GPP LTE to provide a packet switched (PS) network to a circuit switched (CS) network, or vice versa. As a result, the SRVCC procedures can add one or more transcoding points for the call, and thereby degrade the quality of the ongoing call. It is desirable for a transcoder free operation (TrFO) so as to achieve efficient voice quality. The ability to obtain efficient voice quality is especially important for a high definition (HD) voice call.

Technology for transcoding avoidance during a single radio voice call continuity (SRVCC) procedure is disclosed. By avoiding unnecessary transcoding operations when moving between packet switched and circuit switched networks, complexity can be reduced and call quality can be increased. In an example, a mobile switching center (MSC) can include circuitry configured to: receive from a mobility management entity (MME) in a SRVCC packet switch (PS) to circuit switch (CS) request message, selected CODEC information for a selected CODEC used for a user equipment (UE) in an IP Multimedia Subsystem (IMS) over long term evolution LTE system; and communicate the selected CODEC information to a target MSC to enable the target MSC to identify the selected CODEC for the UE to allow the selected CODEC to be used in the CS domain.

Technology for transcoding avoidance during a single radio voice call continuity (SRVCC) procedure is disclosed. In one embodiment, a mobile switching center (MSC) server operable for transcoding avoidance is disclosed. The MSC server can include circuitry is configured to: receive from a mobility management entity (MME) a single radio voice call continuity (SRVCC) packet switch (PS) to circuit switch (CS) request message; communicate a CODEC request message to an IP Multimedia Subsystem (IMS); receive a CODEC query response message from the IMS that includes selected CODEC information for a selected CODEC used for a user equipment (UE) in an IMS over long term evolution LTE system; and communicate the selected CODEC information to a target MSC to enable the target MSC to identify the selected CODEC for the UE to allow the selected CODEC to be used in the CS domain.

During an SRVCC procedure, if a target mobile switching center (MSC) knows the selected CODEC for the voice over LTE, the target MSC can select the proper CODEC for a user equipment (UE) to be used in a circuit switching (CS) domain according to: a CODEC previously used in LTE (i.e. a packet switched (PS) network), the previously used CODECs capability, and also the UE's CODEC capability. In order to avoid transcoding, the target MSC can make it a priority to select the CODEC that was previously used in LTE if the CS network also supports this CODEC. Then the target MSC can notify a target evolved Universal Terrestrial Radio Access Network (E-UTRAN) or global system for mobile communications (GSM) edge radio access network (GERAN) about the selected CODEC. The target UTRAN or GERAN can include this CODEC information in the radio resource control (RRC)-Container in the Target to Source Transparent Container and send the CODEC information to the MSC, then to a mobility management entity (MME) and the E-UTRAN during the handover preparation procedure. Then, during a session transfer procedure, the MSC can notify the ATCF about the selected CODEC for use in the CS network. When the ATCF can know that the CODEC used in the access leg is exactly the same with the CODEC used in the remote leg, during the communication with the ATGW, such information can be further conveyed to the ATGW and then transcoding can be avoided at the ATGW.

Thus, in order to overcome these challenges, the technology provides solutions for transcoding avoidance for improving the quality of a voice call. In one aspect, technology for transcoding avoidance during a single radio voice call continuity (SRVCC) procedure is disclosed. In an example, a mobile switching center (MSC) can include circuitry configured to: receive from a mobility management entity (MME) in a SRVCC PS to CS request message, selected CODEC information for a selected CODEC used for a user equipment (UE) in an IP Multimedia Subsystem (IMS) over a 3GPP LTE system; and communicate the selected CODEC information to a target MSC to enable the target MSC to identify the selected CODEC for the UE to allow the selected CODEC to be used in the CS domain.

In another technology, technology for transcoding avoidance during a single radio voice call continuity (SRVCC) procedure is disclosed. In an example, a mobile switching center (MSC) can include circuitry configured to: receive from a mobility management entity (MME) a single radio voice call continuity (SRVCC) packet switch (PS) to CS request message; communicate a CODEC request message to an IP Multimedia Subsystem (IMS); receive a CODEC query response message from the IMS that includes selected CODEC information for a selected CODEC used for a user equipment (UE) in an IMS over long term evolution LTE system; and communicate the selected CODEC information to a target MSC to enable the target MSC to identify the selected CODEC for the UE to allow the selected CODEC to be used in the CS domain.

In one embodiment, during an IMS session setup procedure, a proxy call session control function (P-CSCF) can be configured to inform a policy and changing rules function (PCRF) about the selected CODEC information. The PCRF can pass this CODEC information to the PCEF and MME consequently. Then during an SRVCC procedure, the MME can include this Codec information in the SRVCC PS to CS Request message and send the Codec information to the MSC Server/Media Gateway (MGW) over an Sv interface. If the MSC Server/MGW also supports the selected Codec by IMS over LTE system, the MSC Server/MGW can decide to use the selected Codec and further pass this information to the target MSC and a radio station subsystem/base station system RNS/BSS. Next, the RNS/BSS can include the selected Codec information in the RRC container of the Target to Source Transparent Container and send the selected Codec information to the eNB. The eNB can send such information to a UE in a handover from the E-UTRAN Command message.

In an alternative embodiment, during an SRVCC procedure, when the MSC Server/MGW receives the SRVCC PS to CS Request message, the MSC Server/MGW can query the selected Codec from the IMS core. If the MSC Server/MGW also supports the Codec selected by the IMS over LTE system, the MSC Server/MGW can decide to use the selected Codec and further pass such information to a target MSC and the RNS/BSS. Then, the RNS/BSS can include the selected Codec information in the RRC container of the Target to Source Transparent Container and send the selected Codec information to the eNB. The eNB can send such information to a UE in the Handover from E-UTRAN Command message.

FIG. 1 illustrates an example of one type of wireless network 100 operable to communicate based on a 3GPP LTE standard. In this example, a 3GPP LTE radio access network (RAN) system is illustrated. The system operates based on the 3GPP LTE specification. While this example is provided, it is not intended to be limiting. Other wireless networks, such as the Institute of Electrical and Electronics Engineers (IEEE) 802.16 standard, commonly referred to as WiMAX (Worldwide interoperability for Microwave Access), can also be used.

For example, some wireless devices communicate use orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which as stated above is commonly known to industry groups as WiMAX, and the IEEE 802.11 standard, which is commonly known to industry groups as WiFi. In 3GPP radio access network (RAN) LTE systems, a node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node. Newer E-UTRAN networks can operate in a packet switched (PS) domain. Older networks, such as UTRAN or GERAN networks, may operate in a circuit switched (CS) domain. As a UE moves between PS and CS networks, additional transcoding has been performed due to the use of different CODECs in the different networks. As previously discussed, the use of additional transcoding can reduce call quality and increase the complexity of the network.

The wireless network 100 illustrated in FIG. 1 is comprised of a radio access network (RAN) 110 and an evolved packet core (EPC) 160. For 3GPP LTE, the RAN 110 illustrated in FIG. 1 can include transmission nodes such as the evolved universal terrestrial radio access (E-UTRAN or eUTRAN) or UTRAN modules, represented as the eNodeBs 112A and 112B. The RAN can be in communication with an evolved packet core (EPC) module. The EPC can include a serving gateway (S-GW) and a mobility management entity (MME) 130. The EPC can also include a packet data network (PDN) gateway (P-GW) 142 to couple a serving gateway (S-GW) to the PDN, such as the Internet 180, an intra-net, or other similar network. The S-GW can provide Internet network access and standard network access for the mobile devices associated with the RAN. The S-GW and MME can be in direct communication with each other via cabling, wire, optical fiber, and/or transmission hardware, such a router or repeater. The eNodeBs 112A-B can be connected to user equipment (UEs) 150A-B via an LTE radio link 115 A-B, respectively. A backhaul link 114, such as an X2 link, can be used to connect the eNBs. The X2 link is typically formed over a broadband wired or optical connection between the eNBs, although a wireless connection can be used.

Connections between the eNBs 112A-B, the S-GW 120, and the MME 130 can be made via S1 type connections 124A-B, and 126A-B. The S1 interface is described in various 3GPP Technical Specification (TS) 36.410 versions, such as Version 8 (2008-12-11), 9 (2009-12-10), 10 (2011-03-23), 11 (2012-09-12), and 12 (2014-09-17) which are available to the public.

The EPC 160 can also include a policy and charging rules function (PCRF) node 144 that can be used to determine, in near real time, policy rules in the wireless network. The PCRF node can access subscriber databases and other specialized functions, such as charging systems, as can be appreciated.

The eNBs 112A-B can include one or more antennas, one or more radio modules to modulate and/or demodulate signals transmitted or received on an air interface, and one or more digital modules to process signals transmitted and received on the air interface. The eNBs can be a relatively high power node, referred to as a "macro node" or a relatively low power node (LPN). An LPN can include a micro node, pico node, home eNB (HeNB), remote radio head (RRM), remote radio entity (RRE), and the like.

Figure 2:
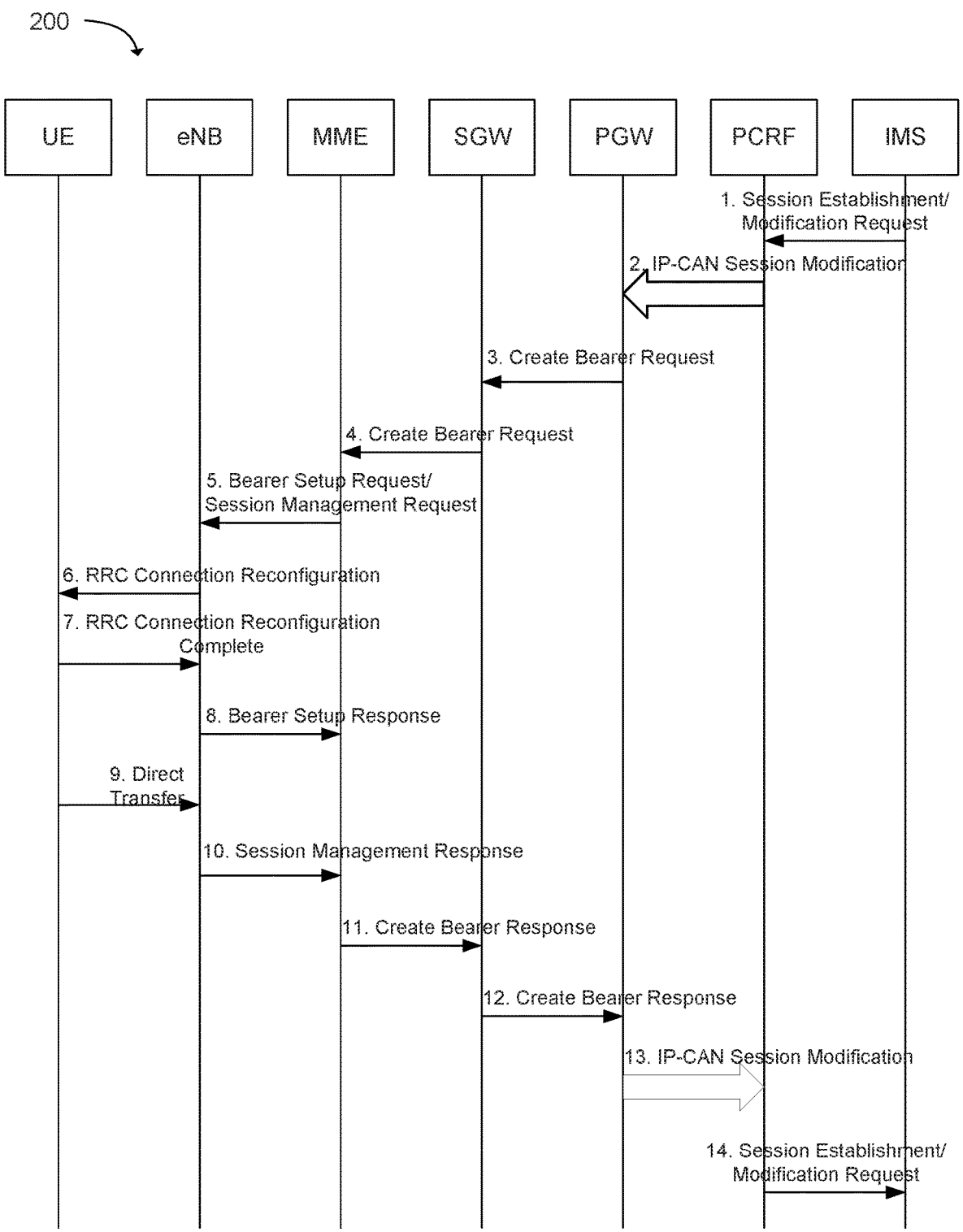
FIG. 2 illustrates a dedication bearer activation procedure in accordance with an example.

FIG. 2 illustrates a dedicated bearer activation procedure in accordance with an example. In one embodiment, a session initiator can include a session description protocol (SDP) in a session initiation protocol (SIP) INVITE message that lists every media characteristics (including codecs) that the originator is willing to support for this session. When the message arrives at the destination endpoint, it responds with the media characteristics (e.g. common subset of codecs) that it is also willing to support for the session. Media authorization can be performed for these media characteristics. The session initiator, upon receiving the common subset, can determine the media characteristics (including codecs) to be used initially.

In action 1, an IP Multimedia Subsystem (IMS) initiates a session establishment/modification request. That is, the P-CSCF can send a Session Establishment/Modification Request message to a PCRF. The Session Establishment/Modification request can include a negotiated Codec or changed Codec information and other related information to PCRF. The SEM request and CODEC information can be communicated over an Rx interface. The communication of the information to the PCRF over the RX interface is described in 3GPP Technical Specification (TS) 29.214. For example, 3GPP TS 29.214 Version 12.4.0 released June, 2014 describes the communication of the information to the PCRF over the RX interface. In action 2, if a dynamic policy control and charging (PCC) function is deployed, the PCRF can send a PCC decision provision (Quality of Service (QoS) policy) message to the P-GW. This corresponds to the initial actions of the PCRF-Initiated internet protocol connectivity access network (IP-CAN) Session Modification procedure or to the PCRF response in the PCEF initiated IP-CAN Session Modification procedure, up to the point that the PDN GW requests IP-CAN Bearer Signalling. The PCC decision provision message can indicate that User Location Information and/or UE Time Zone Information are to be provided to the PCRF. If dynamic PCC is not deployed, the PDN GW (PGW) can apply local QoS policy.

In action 3, the PGW can use this QoS policy to assign an evolved packet system (EPS) Bearer QoS, i.e., the PGW assigns the values to the bearer level QoS parameters, such as QoS class identifier (QCI), allocation, retention, and priority (ARP), guaranteed bit rate (GBR) and maximum bit rate (MBR). If this dedicated bearer is created as part of the handover procedure from non-3GPP access with GTP-based S2a/S2b, then the PGW can apply the Charging Id already in use for the corresponding dedicated bearer while the UE was in non-3GPP access (i.e., bearer with the same QCI and ARP as in non-3GPP access). Otherwise, the PGW can generate a Charging Id for the dedicated bearer. The PDN GW can send a Create Bearer Request message [international mobile subscriber identify (IMSI), procedure transaction Id (PTI), EPS Bearer QoS, traffic flow template (TFT), S5/S8 tunnel endpoint identifier (TEID), Charging Id, Linked EPS Bearer Identity, and Protocol Configuration Options] to the Serving GW, the Linked EPS Bearer Identity (LBI) is the EPS Bearer Identity of the default bearer. The Procedure Transaction Id (PTI) parameter may only be used when the procedure was initiated by a UE Requested Bearer Resource Modification Procedure. Protocol Configuration Options can be used to transfer application level parameters between the UE and the PGW, and are sent transparently through the MME and the Serving GW. It should be noted that the protocol configuration options (PCO) can be sent in the dedicated bearer activation procedure either in response to a PCO received from the UE, or without the need to send a response to a UE provided PCO e.g. when the network wants the bearer to be dedicated for IMS signaling.

In action 4, the Serving GW can send the Create Bearer Request message to the MME. If the UE is in an ECM-IDLE state, the MME can trigger the Network Triggered Service Request from action 3. In that case the following actions 5-8 can be combined into a Network Triggered Service Request procedure or be performed stand-alone.

It should be noted, that selected CODEC information can be included in messages used in actions 2-4.

In action 5, the MME can select an EPS Bearer Identity, which has not yet been assigned to the UE. The MME can then build a Session Management Request including the PTI, TFT, EPS Bearer QoS parameters (excluding ARP), Protocol Configuration Options, the EPS Bearer Identity, the Linked EPS Bearer Identity (LBI) and a WLAN offloadability indication. If the UE has UTRAN or GERAN capabilities and the network supports mobility to UTRAN or GERAN, the MME can use the EPS bearer QoS parameters to derive the corresponding PDP context parameters QoS Negotiated (R99 QoS profile), Radio Priority, Packet Flow Id and TI and includes them in the Session Management Request. If the UE indicated in the UE Network Capability that it does not support BSS packet flow procedures, then the MME can be configured to not include the Packet Flow ID.

The MME can then signal the Bearer Setup Request (EPS Bearer Identity, EPS Bearer QoS, Session Management Request, S1-TEID) message to the eNodeB. The MME can include an indication whether the traffic of this PDN Connection is allowed to be offloaded to the WLAN.

In action 6, the eNodeB can map the EPS Bearer QoS to the Radio Bearer (RB) QoS. The eNodeB can then signal an RRC Connection Reconfiguration (Radio Bearer QoS, Session Management Request, EPS RB Identity) message to the UE. The UE can be configured to store the QoS Negotiated, Radio Priority, Packet Flow Id and TI, which it received in the Session Management Request, for use when accessing via GERAN or UTRAN. The UE NAS can store the EPS Bearer Identity and link the dedicated bearer to the default bearer indicated by the Linked EPS Bearer Identity (LBI). The UE can use the uplink packet filter (UL TFT) to determine the mapping of traffic flows to the radio bearer. The UE can provide the EPS Bearer QoS parameters to the application handling the traffic flow. The application usage of the EPS Bearer QoS can be implementation dependent. The UE can be configured so that it does not reject the RRC Connection Reconfiguration on the basis of the EPS Bearer QoS parameters contained in the Session Management Request.

In action 7, the UE can acknowledge the radio bearer activation to the eNodeB with a RRC Connection Reconfiguration Complete message. In action 8, the eNodeB can acknowledge the bearer activation to the MME with a Bearer Setup Response (EPS Bearer Identity, S1-TEID) message. The eNodeB can indicate whether the requested EPS Bearer QoS could be allocated or not. The MME can be configured to be prepared to receive the RRC Connection Reconfiguration Complete message either before or after the Session Management Response message (sent in action 10).

In action 9, the UE NAS layer can build a Session Management Response including EPS Bearer Identity. The UE can then send a Direct Transfer (Session Management Response) message to the eNodeB. In action 10, the eNodeB can send an Uplink NAS Transport (Session Management Response) message to the MME.

In action 11, upon reception of the Bearer Setup Response message in action 8, and the Session Management Response message in action 10, the MME can acknowledge the bearer activation to the Serving GW by sending a Create Bearer Response (EPS Bearer Identity, S1-TEID, User Location Information (ECGI) or otherwise known as E-UTRAN Cell Mobile Identifier (ECGI)) message.

In action 12, the Serving GW can acknowledge the bearer activation to the PDN GW by sending a Create Bearer Response (EPS Bearer Identity, S5/S8-TEID, User Location Information (ECGI)) message.

In action 13, if the dedicated bearer activation procedure was triggered by a PCC Decision Provision message from the PCRF, the PDN GW indicates to the PCRF whether the requested PCC decision (QoS policy) could be enforced or not, allowing the completion of the PCRF-Initiated IP-CAN Session Modification procedure or the PCEF initiated IP-CAN Session Modification procedure, after the completion of IP-CAN bearer signaling. If requested by the PCRF the PDN GW indicates User Location Information and/or UE Time Zone Information to the PCRF. The exact signaling of action 2 and 13 (e.g. for local break-out) is outside the scope of this specification. This signaling and its interaction with the dedicated bearer activation procedure can be specified. In action 14, the PCRF can respond with a Session Establishment/Modification Response message to the P-CSCF.

Figure 3:
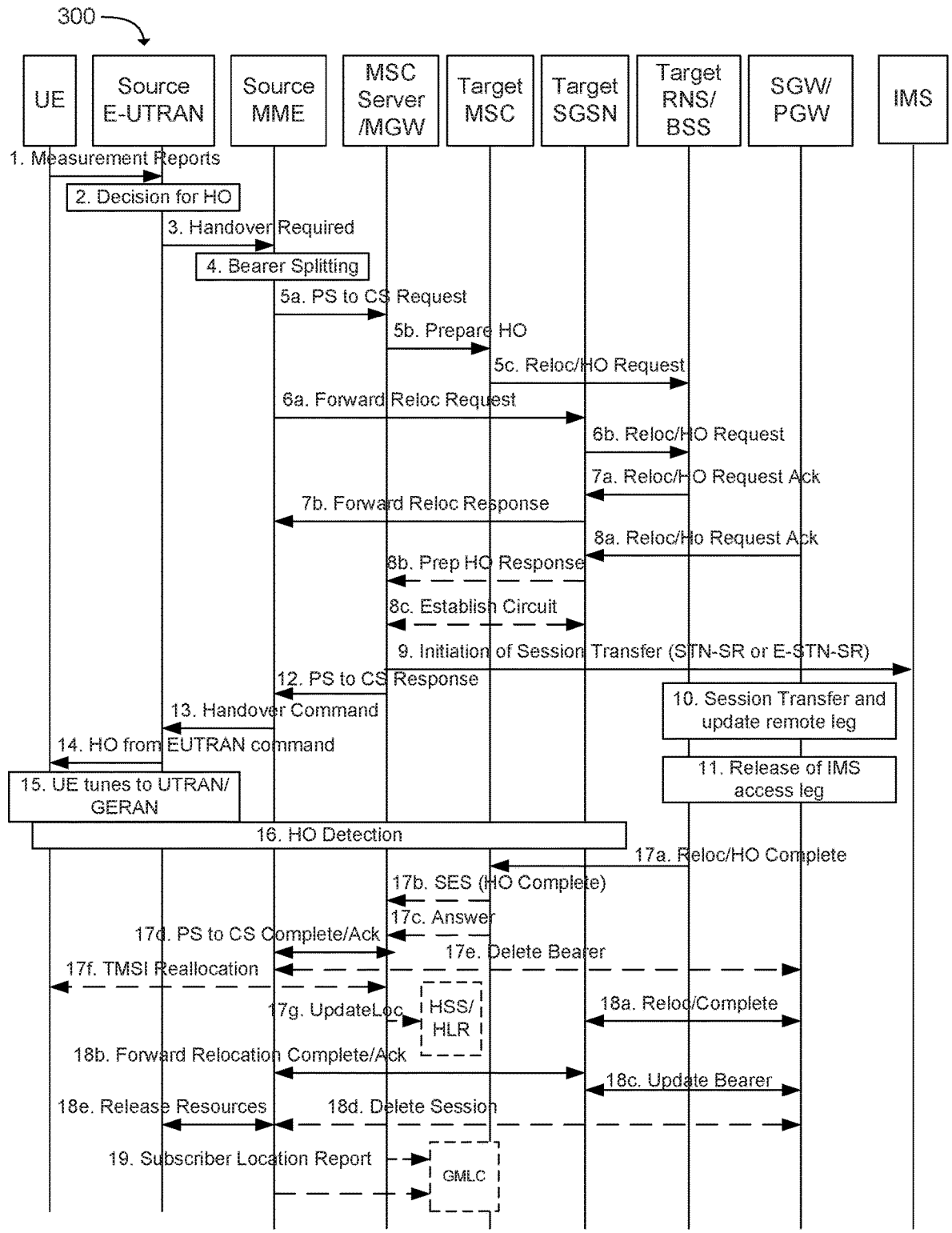
FIG. 3 illustrates a single radio voice call continuity (SRVCC) procedure with packet switching (PS) handover for transcoding avoidance during SRVCC in accordance with an example.

FIG. 3 illustrates a single radio voice call continuity (SRVCC) procedure with packet switching (PS) handover for transcoding avoidance during SRVCC in accordance with an embodiment of the present disclosure. More specifically, FIG. 3 depicts a call flow for SRVCC from E-UTRAN to UTRAN or GERAN with a dual transfer mode (DTM) Handover (HO) support, including the handling of the non-voice component. The flow is configured so that an eNB can determine that either the target is a UTRAN with PS HO or the target is a GERAN with DTM support and the UE is supporting the DTM. In action 1, the UE can be configured to send a measurement reports to E-UTRAN. In action 2, based on the UE measurement reports, the source E-UTRAN can trigger an SRVCC handover (HO) to UTRAN/GERAN. In action 3, if a target is the UTRAN, the source E-UTRAN can send a Handover Required (Target ID, generic Source to Target Transparent Container, SRVCC HO indication) message to the source MME. The SRVCC HO indication can indicate to the MME that this is for the circuit switch (CS) and packet switch (PS) HO (CS+PS handover). It should be noted that when the source E-UTRAN ndicates using SRVCC HO Indication that target is both CS and PS capable and this is a CS+PS HO request, the source MME can be configured to send the single received transparent container to both the target CS domain and the target PS domain. If the target is the GERAN, the source E UTRAN can send a Handover Required (Target ID, generic Source to Target Transparent Container, additional Source to Target Transparent Container, SRVCC HO Indication) message to the source MME. The E-UTRAN can place the "old BSS to new BSS information IE" for the CS domain in the additional Source to Target Transparent Container. In this case, the MME identifies from SRVCC HO Indication that this is a request for a CS+PS handover.

In action 4, based on the QCI associated with the voice bearer (QCI 1) and the SRVCC HO Indication, the source MME can be configured to split the voice bearer from all other PS bearers and initiates relocation of all other PS bearers and/or the voice bearer towards MSC Server and SGSN, respectively.

In action 5a, a source MME can initiate the PS-CS handover procedure for the voice bearer by sending a SRVCC PS to CS Request (IMSI, Target ID, session transfer number-single radio (STN-SR), correlation mobile station international subscriber directory number (C-MSISDN), Source to Target Transparent Container, MM Context, and/or Emergency Indication) message to the MSC Server. The SRVCC PS to CS request message can also include the selected Codec information that was selected in IMS over LTE. The selected Codec information can be included in a NAS synchronization indicator and passed to the RNS/BSS. The RNS/BSS can include the NAS synchronization indicator in the RRC container of the Target to Source Transparent Container and send the NAS synchronization indicator to the eNodeB. The eNodeB can then send the Codec information to the UE in the Handover from E-UTRAN Command message in actions 13 and 14.

If SRVCC with priority is supported, the MME can also include priority indication in the SRVCC PS to CS Request if it detects the SRVCC requires priority handling. The detection is based on the ARP associated with the EPS bearer used for the IMS signaling. The priority indication can correspond to the ARP information element. The Emergency Indication and the equipment identifier can be included if the ongoing session is emergency session. Authenticated IMSI and C-MSISDN shall also be included if available. The message can include information relevant to the CS domain only. The MME can receive a STN-SR and C-MSISDN from the HSS as part of the subscription profile downloaded during the E-UTRAN attach procedure. The MM Context can contain security related information. A CS security key can be derived by the MME from the E-UTRAN/EPS domain key. The CS Security key can be sent in the MM Context.

In action 5b, the MSC Server can interwork the PS-CS handover request with a CS inter-MSC handover request by sending a Prepare Handover Request message to the target MSC. If the SRVCC with priority is supported and the MSC Server receives the priority indication (i.e. ARP) in the SRVCC PS to CS Request, the MSC server/MGW can send a Prepare Handover Request message to the Target MSC with priority indication mapped from the ARP. The MSC Server can map the ARP to the priority level, pre-emption capability/vulnerability for CS services based on local regulation or operator settings. The priority indication can indicate the CS call priority during handover can be specified for UMTS and for GSM/EDGE. If the target system is GERAN, the MSC Server can assign a default service area identification (SAI) as Source ID on the interface to the target BSS and uses base station subnetwork management application part (BSSMAP) encapsulated for the Prepare Handover Request. If the target system is UTRAN, the MSC Server can use RANAP encapsulated for the Prepare Handover Request.

It should be noted that the value of the default SAI can be configured in the MSC and allow a release and later a base station controller BSC to identify that the source for the SRVCC Handover is E-UTRAN. To ensure correct statistics in the target base station subnetwork (BSS) the default SAI should be different from the SAIs used in UTRAN.

In action 5c, the Target MSC can request resource allocation for the CS relocation by sending the Relocation Request/Handover Request message to the target RNS/BSS. If the MSC Server indicated priority, a Radio Network Controller/Base Station subnetwork (RNC/BSS) can allocate the radio resource based on the existing procedures with priority indication for GSM/EDGE. If the target radio access technologies (RAT) are the UTRAN, the Relocation Request/Handover Request message can contain the generic Source to Target Transparent Container. If the target RAT is GERAN, the Relocation Request/Handover Request message can contain the additional Source to Target Transparent Container In action 6a-b, in parallel to the previous actions (e.g., actions 5a-5c), the source MME can be configured to initiate relocation of the PS bearers. In action 6a, the Source MME sends a Forward Relocation Request (generic Source to Target Transparent Container, MM Context, PDN Connections IE) message to the target SGSN. If a target serving general packet radio services (GPRS) support node (SGSN) uses S4 based interaction with S-GW and P-GW, the PDN Connections IE can include bearer information for all bearers except the voice bearer. The handling of security keys for PS handover of the remaining non-voice PS bearers can also be specified.

It should be noted that if the target SGSN uses Gn/Gp interface based interaction with GGSN the Forward Relocation Request can contain PDP Contexts, instead of PDN Connections IE, including bearer information for all bearers except the voice bearer.

In action 6b) the target SGSN can request resource allocation for the PS relocation by sending the Relocation Request/Handover Request (Source to Target Transparent Container) message to the target RNS/BSS.

In actions 7a-b, after the target RNS/BSS receives both the CS relocation/handover request with the PS relocation/handover request; the target RNS/BSS assigns the appropriate CS and PS resources. In action 7a, the target RNS/BSS can acknowledge the prepared PS relocation/handover by sending the Relocation Request Acknowledge/Handover Request Acknowledge (Target to Source Transparent Container) message to the target SGSN. In action 7b, the target SGSN can send a Forward Relocation Response (Target to Source Transparent Container) message to the source MME.

Actions 8a-c can be executed in parallel to the previous action. In action 8a, the target RNS/BSS can acknowledge the prepared CS relocation/handover by sending the Relocation Request Acknowledge/Handover Request Acknowledge (Target to Source Transparent Container) message to the target MSC. In action 8b, the target MSC can send a Prepare Handover Response (Target to Source Transparent Container) message to the MSC Server. In action 8c, a circuit connection can be established between the target MSC and the MGW associated with the MSC Server (e.g., using integrated services digital network user part (ISUP), initial address message (IAM), and address complete message (ACM) messages).

It should be noted that the target to Source Transparent Container sent to the target SGSN is action 7a and the Target to Source Transparent Container sent to the target MSC in action 8a, can include the same allocation of CS and PS resources (e.g. the target BSS includes the same DTM Handover Command in both containers).

In action 9, for a non-emergency session, the MSC Server can be configured to initiate the Session Transfer by using the STN-SR e.g. by sending an ISUP IAM (STN-SR) message towards the IMS. If this is a priority session, the MSC Server can send the SIP Session Transfer message with the priority indication to the IMS and the IMS entity handles the session transfer procedure with priority. The priority indication in the SIP Session Transfer message can be mapped by the MSC Server from the priority indication (i.e. ARP) in the SRVCC PS to CS Request received in action 5. The mapping of the priority level can be based on operator policy and/or local configuration, and the IMS priority indicator should be the same as for the original IMS created over PS. For emergency session, the MSC Server can be configured to initiate the Session Transfer by using the locally configured Emergency Session Transfer Number for SRVCC (E-STN-SR) and by including the equipment identifier. IMS Service Continuity or Emergency IMS Service Continuity procedures can be applied for execution of the Session Transfer. It should be noted that action 9 can be started after action 8b. If the MSC Server is using an ISUP interface, then the initiation of the session transfer for non-emergency sessions can fail if the subscriber profile including CAMEL triggers is not available prior handover, and can also fail if CAMEL triggers are available and local anchor transfer function is used. If the subscriber profile is available prior to handover then the CAMEL can trigger others than those used and not used during the transfer.

In action 10, during the execution of the Session Transfer procedure the remote end can be updated with the SDP of the CS access leg. The downlink flow of VoIP packets can be switched towards the CS access leg at this point.

In action 11, the source IMS access leg can be released. It should be noted that in one embodiment, actions 10 and 11 can be independent of action 12.

In action 12, the MSC Server can send a SRVCC PS to CS Response (Target to Source Transparent Container) message to the source MME. In action 13, the source MME can synchronize the two prepared relocations and can send a Handover Command (Target to Source Transparent Container) message to the source E-UTRAN. When the target cell is GERAN, the MME can receive different Target to Source Transparent Containers from the MSC Server and from the SGSN, i.e. a "New BSS to Old BSS Information" can be received from the MSC Server and a "Target BSS to Source BSS Transparent Container" can be received from the SGSN.

In action 14, the E-UTRAN can be configured to send a Handover from E-UTRAN Command message to the UE.

In action 15, the UE tunes to the target UTRAN/GERAN cell. In action 16, the Handover Detection at the target RNS/BSS can occur. The UE can send a Handover Complete message via the target RNS/BSS to the target MSC. If the target MSC is not the MSC Server, then the Target MSC can send an SES (Handover Complete) message to the MSC Server. At this stage, the UE can re-establish the connection with the network and can send/receive voice data.

In action 17, the CS relocation/handover can be complete. In action 17a, the target RNS/BSS sends Relocation Complete/Handover Complete message to the target MSC. In action 17b, the target MSC can send an SES (Handover Complete) message to the MSC Server. The speech circuit is through connected in the MSC Server/MGW. In action 17c, the establishment procedure with ISUP Answer message to the MSC Server can be complete. In action 17d, the MSC Server can send a SRVCC PS to CS Complete Notification message to the source MME. Source MME can be configured to acknowledge the information by sending a SRVCC PS to CS Complete Acknowledge message to the MSC Server.

In action 17e, the source MME can deactivate the voice bearer towards 5-GW/P-GW and can set the PS-to-CS handover indicator to Delete Bearer Command message. This can trigger an MME-initiated Dedicated Bearer Deactivation procedure. The MME does not send deactivation request toward the eNodeB on receiving PS-to-CS Complete Notification in action 17d. If dynamic PCC is deployed, the PGW can interact with PCRF. If the HLR is to be updated, i.e. if the IMSI is authenticated but unknown in the VLR, the MSC Server can perform a TMSI reallocation towards the UE using its own non-broadcast LAI and, if the MSC Server and other MSC/visitor location registers (VLRs) serve the same (target) LAI, with its own Network Resource Identifier (NRI). The TMSI reallocation is performed by the MSC Server towards the UE via target MSC.

In action 17g, if the MSC Server performed a TMSI reallocation in action 17f, and if this TMSI reallocation was completed successfully, the MSC Server can perform a MAP Update Location to the HSS/HLR. It should be noted that this Update Location is not initiated by the UE.

In actions 18a-e, in parallel to the previous action, the PS relocation/handover can be completed. In action 18a, the target RNS/BSS can send Relocation Complete/Handover Complete message to target SGSN. In action 18b, the target SGSN can be configured to send a Forward Relocation Complete message to the source MME. After having completed action 17e, the source MME can be configured to acknowledge the information by sending a Forward Relocation Complete Acknowledge message to the target SGSN. In action 18c, when Target SGSN has received the Forward Relocation Complete Acknowledge (Ack) message from the MME in action 18b, the Target SGSN can update the bearer with S-GW/P-GW/GGSN. In action 18d, the MME can send Delete Session Request to the SGW.

In action 18e, the source MME can send a Release Resources message to the Source eNodeB. The Source eNodeB can release its resources related to the UE and can respond back to the MME. Routing Area Update procedures can be by the UE.

In action 19, for an emergency services session after handover is complete, the source MME or the MSC Server can send a Subscriber Location Report carrying the identity of the MSC Server to a gateway mobile location center (GMLC) associated with the source or target side, respectively, to support location continuity. Any configuration of the choice between a source MME versus MSC Server update to the GMLC needs to ensure that a single update occurs from one of these entities when the control plane location solution is used on the source and/or target sides. In case the MME determines that only the relocation of the voice bearer but not the relocation of one or more PS bearers succeeds, then the MME can proceed with action 13 after receiving SRVCC PS to CS Response from the MSC Server in action 12 and both UE and MME continue the procedure.

Figure 4:
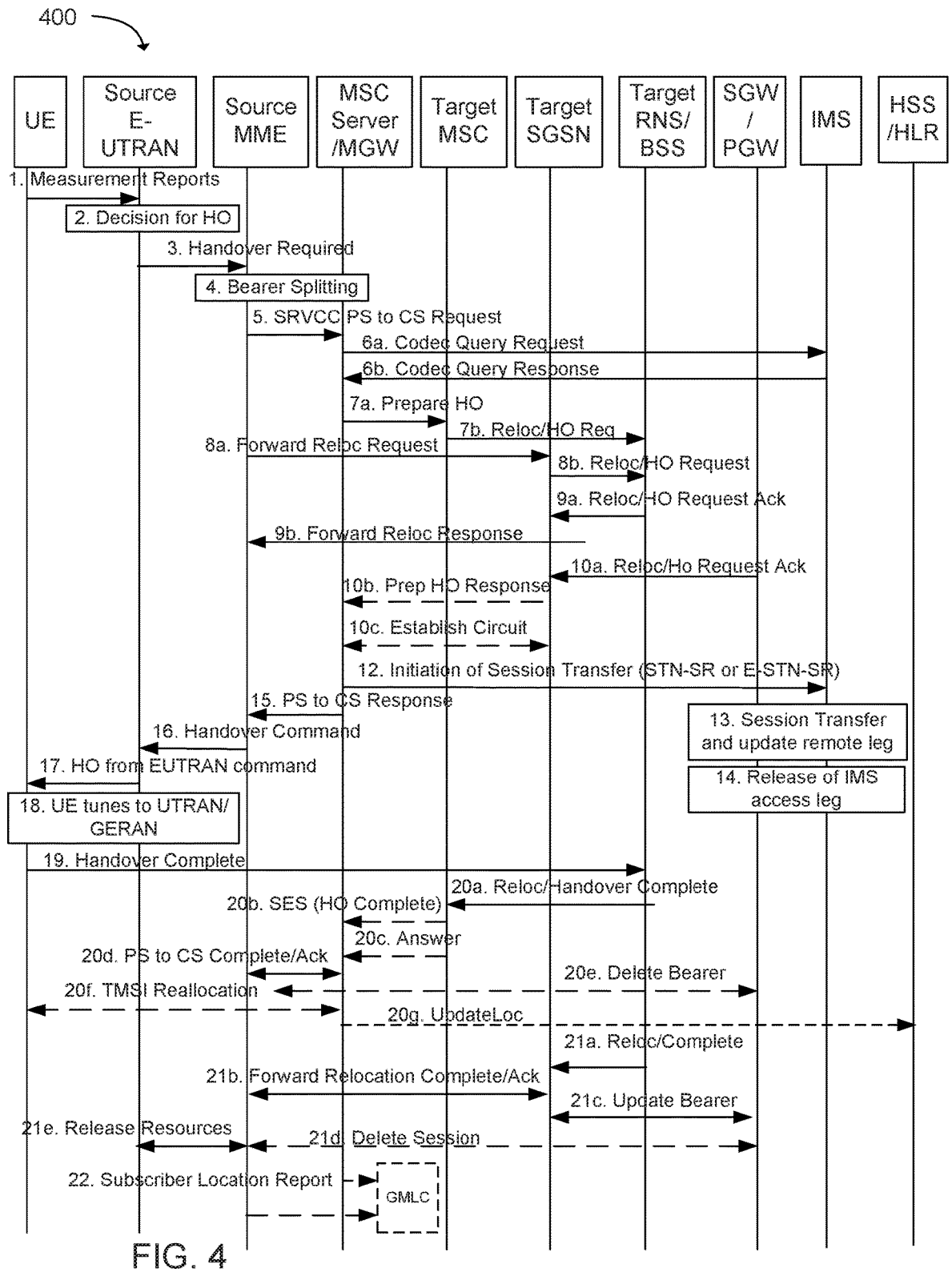
FIG. 4 illustrates CODEC query from an IP Multimedia Subsystem (IMS) during SRVCC for transcoding avoidance in accordance with an example.

FIG. 4 illustrates CODEC query from an IP Multimedia Subsystem (IMS) during SRVCC for transcoding avoidance in accordance with an embodiment of the present disclosure. More specifically, FIG. 4 depicts a call flow for a CODEC query from and IMS during SRVCC. The flow 400 requires that either eNB can determine that either the target is UTRAN with PS HO or the target is GERAN with DTM support and the UE is supporting DTM. In action 1, the UE can send a measurement reports to E-UTRAN. In action 2, based on the UE measurement reports, the source E-UTRAN can trigger an SRVCC handover (HO) to UTRAN/GERAN. In action 3, if a target is the UTRAN, the source E-UTRAN can send a Handover Required (Target ID, generic Source to Target Transparent Container, SRVCC HO indication) message to the source MME. The SRVCC HO indication can indicate to the MME that this is for the circuit switch (CS) and packet switch (PS) HO. It should be noted that when the source E-UTRAN indicates using SRVCC HO Indication that target is both CS and PS capable and this is a CS+PS HO request, the source MME can send the single received transparent container to both the target CS domain and the target PS domain. If the target is the GERAN, the source E UTRAN can send a Handover Required (Target ID, generic Source to Target Transparent Container, additional Source to Target Transparent Container, SRVCC HO Indication) message to the source MME. The E-UTRAN can place the "old BSS to new BSS information IE" for the CS domain in the additional Source to Target Transparent Container. In this case, the MME can identify from SRVCC HO Indication that this is a request for a CS+PS handover.

In action 4, based on the QCI associated with the voice bearer (QCI 1) and the SRVCC HO Indication, the source MME can splits the voice bearer from all other PS bearers and initiates their relocation towards MSC Server and SGSN, respectively.

In action 5, a source MME can initiate the PS-CS handover procedure for the voice bearer by sending a SRVCC PS to CS Request (IMSI, Target ID, STN-SR, C-MSISDN, Source to Target Transparent Container, MM Context, Emergency Indication) message to the MSC Server. If SRVCC with priority is supported, the MME can also include priority indication in the SRVCC PS to CS Request if it detects the SRVCC requires priority handling. In other words, in action 5, the MSC Server can receive from a mobility management entity (MME) in an single radio voice call continuity (SRVCC) packet switch (PS) to CS request message, selected CODEC information for a selected CODEC used for a user equipment (UE) in an IP Multimedia Subsystem (IMS) over long term evolution LTE system.

In action 6a, the MSC server can communicate a CODEC request message to an IP Multimedia Subsystem (IMS). When the MSC Server receives the SRVCC PS to CS Request message, the MSC Server can first query about the selected Codec in IMS over LTE by sending a Codec Query Request message to the P-CSCF with a proper identifier of the user (e.g. correlation mobile station international subscriber directory number "C-MSISDN") and the services centralization and continuity (SCC) application server (AS) (SCC AS) or access transfer control function (ATCF) (e.g. STN-SR or E-STN-SR).

In action 6b, the MSC server can receive a CODEC query response message from the IMS that includes selected CODEC information for a selected CODEC used for a user equipment (UE) in an IMS over long term evolution (LTE) system. The MSC server can later communicate the selected CODEC information to a target MSC to enable the target MSC to identify the selected CODEC for the UE to allow the selected CODEC to be used in the CS domain. In another example, in action 6b, the P-CSCF can respond with a Codec Query Response message by including the original Codec information selected in IMS over LTE.

In action 7a, the MSC Server can interwork the PS-CS handover request with a CS inter-MSC handover request by sending a Prepare Handover Request message to the target MSC. If the SRVCC with priority is supported and the MSC Server receives the priority indication (i.e. ARP) in the SRVCC PS to CS Request, the MSC server/MGW can send a Prepare Handover Request message to the Target MSC with priority indication mapped from the ARP. The MSC Server can map the ARP to the priority level, pre-emption capability/vulnerability for CS services based on local regulation or operator settings. The priority indication can indicate the CS call priority during handover can be specified for UMTS and for GSM/EDGE. If the target system is GERAN, the MSC Server can assign a default SAI as Source ID on the interface to the target BSS and uses BSSMAP encapsulated for the Prepare Handover Request. If the target system is UTRAN, the MSC Server can use RANAP encapsulated for the Prepare Handover Request.

It should be noted that the value of the default SAI can be configured in the MSC and can allow a release and later BSC to identify that the source for the SRVCC Handover is E-UTRAN. To ensure correct statistics in the target BSS the default SAI should be different from the SAIs used in UTRAN.

In action 7b, the Target MSC can request resource allocation for the CS relocation by sending the Relocation Request/Handover Request message to the target RNS/BSS. If the MSC Server indicated priority, the RNC/BSS can allocate the radio resource based on the existing procedures with priority indication for GSM/EDGE. If the target RAT is the UTRAN, the Relocation Request/Handover Request message can contain the generic Source to Target Transparent Container. If the target RAT is GERAN, the Relocation Request/Handover Request message can contain the additional Source to Target Transparent Container In action 8a-b, in parallel to the previous actions, the source MME can initiate relocation of the PS bearers. In action 8a, the Source MME can send a Forward Relocation Request (generic Source to Target Transparent Container, MM Context, PDN Connections IE) message to the target SGSN. If the target SGSN uses S4 based interaction with S-GW and P-GW, the PDN Connections IE can include bearer information for all bearers except the voice bearer. The handling of security keys for PS handover of the remaining non-voice PS bearers can also be specified.

It should be noted that if the target SGSN can use Gn/Gp based interaction with GGSN the Forward Relocation Request can contain PDP Contexts, instead of PDN Connections IE, including bearer information for all bearers except the voice bearer.

In action 8b, the target SGSN requests resource allocation for the PS relocation by sending the Relocation Request/Handover Request (Source to Target Transparent Container) message to the target RNS/BSS.

In actions 9a-b, after the target RNS/BSS receives both the CS relocation/handover request with the PS relocation/handover request, it assigns the appropriate CS and PS resources. In action 9a, the target RNS/BSS can acknowledge the prepared PS relocation/handover by sending the Relocation Request Acknowledge/Handover Request Acknowledge (Target to Source Transparent Container) message to the target SGSN. In action 9b, the target SGSN can send a Forward Relocation Response (Target to Source Transparent Container) message to the source MME.

Actions 10a-b can be executed in parallel to the previous action. In action 10a, the target RNS/BSS can acknowledge the prepared CS relocation/handover by sending the Relocation Request Acknowledge/Handover Request Acknowledge (Target to Source Transparent Container) message to the target MSC. In action 10b, the target MSC can send a Prepare Handover Response (Target to Source Transparent Container) message to the MSC Server.

It should be noted that the target to Source Transparent Container sent to the target SGSN is action 9a and the Target to Source Transparent Container sent to the target MSC in action 10a, can include the same allocation of CS and PS resources (e.g. the target BSS includes the same DTM Handover Command in both containers).

In action 11, a circuit connection can be established between the target MSC and the MGW associated with the MSC Server (e.g., using ISUP IAM and ACM messages).

In action 12, for a non-emergency session, the MSC Server can initiate the Session Transfer by using the STN-SR e.g. by sending an ISUP IAM (STN-SR) message towards the IMS. If this is a priority session, the MSC Server can send the SIP Session Transfer message with the priority indication to the IMS and the IMS entity can handle the session transfer procedure with priority. The priority indication in the SIP Session Transfer message can be mapped by the MSC Server from the priority indication (i.e. ARP) in the SRVCC PS to CS Request received in action 5. The mapping of the priority level can be based on operator policy and/or local configuration, and the IMS priority indicator should be the same as for the original IMS created over PS. For emergency session, the MSC Server can be configured to initiate the Session Transfer by using the locally configured E-STN-SR and by including the equipment identifier. IMS Service Continuity or Emergency IMS Service Continuity procedures are applied for execution of the Session Transfer. It should be noted that action 12 can be started after action 10b. If the MSC Server is using an ISUP interface, then the initiation of the session transfer for non-emergency sessions can fail if the subscriber profile including CAMEL triggers is not available prior handover, and can also fail if CAMEL triggers are available and local anchor transfer function is used. If the subscriber profile is available prior to handover then the CAMEL triggers others than those used and not used during the transfer.

In action 13, during the execution of the Session Transfer procedure, the remote end can be updated with the SDP of the CS access leg. The downlink flow of VoIP packets can be switched towards the CS access leg at this point.

In action 14, the source IMS access leg can be released. It should be noted that in one embodiment, actions 13 and 14 can be independent of action 15.

In action 15, the MSC Server can send a SRVCC PS to CS Response (Target to Source Transparent Container) message to the source MME. In action 16, the source MME can synchronize the two prepared relocations and can send a Handover Command (Target to Source Transparent Container) message to the source E-UTRAN. When the target cell is GERAN, the MME can receive different Target to Source Transparent Containers from the MSC Server and from the SGSN, i.e. a "New BSS to Old BSS Information" can be received from the MSC Server and a "Target BSS to Source BSS Transparent Container" can be received from the SGSN.

In action 17, the E-UTRAN can send a Handover from E-UTRAN Command message to the UE.

In action 18, the UE can tune to the target UTRAN/GERAN cell. In action 19, the Handover Detection at the target RNS/BSS can occur. The UE can send a Handover Complete message via the target RNS/BSS to the target MSC. If the target MSC is not the MSC Server, then the Target MSC can send an SES (Handover Complete) message to the MSC Server. At this stage, the UE can be configured to re-establishes the connection with the network and can send/receive voice data.

In action 20, the CS relocation/handover can be complete. In action 20a, the target RNS/BSS can send Relocation Complete/Handover Complete message to the target MSC. In action 20b, the target MSC can send an SES (Handover Complete) message to the MSC Server. The speech circuit is through connected in the MSC Server/MGW. In action 20c) the establishment procedure with ISUP Answer message to the MSC Server can be complete. In action 20d, the MSC Server can send a SRVCC PS to CS Complete Notification message to the source MME. Source MME can acknowledge the information by sending a SRVCC PS to CS Complete Acknowledge message to the MSC Server.

In action 20e, the source MME can deactivate the voice bearer towards 5-GW/P-GW and can set the PS-to-CS handover indicator to Delete Bearer Command message. This can trigger an MME-initiated Dedicated Bearer Deactivation procedure. The MME can be configured not to send a deactivation request toward the eNodeB on receiving PS-to-CS Complete Notification in action 20d. If dynamic PCC is deployed, the PGW can interact with PCRF. If the HLR is to be updated, i.e. if the IMSI is authenticated but unknown in the VLR, the MSC Server performs a temporary mobile subscriber identity (TMSI) reallocation towards the UE using its own non-broadcast LAI and, if the MSC Server and other MSC/VLRs serve the same (target) LAI, with its own Network Resource Identifier (NRI). The TMSI reallocation can be performed by the MSC Server towards the UE via target MSC.

In action 20g, if the MSC Server performed a TMSI reallocation in action 20f, and if this TMSI reallocation was completed successfully, the MSC Server can perform a MAP Update Location to the HSS/HLR. It should be noted that this Update Location is not initiated by the UE.

In actions 21a-e, in parallel to the previous action, the PS relocation/handover can be completed. In action 21a) the target RNS/BSS can send Relocation Complete/Handover Complete message to target SGSN. In action 21b, the target SGSN can send a Forward Relocation Complete message to the source MME. After having completed action 20e, the source MME can acknowledge the information by sending a Forward Relocation Complete Acknowledge message to the target SGSN. In action 21c, when Target SGSN has received the Forward Relocation Complete Ack message from the MME in action 21b, the Target SGSN can update the bearer with S-GW/P-GW/GGSN. In action 21d, the MME can send Delete Session Request to the SGW.

In action 21e, the source MME can send a Release Resources message to the Source eNodeB. The Source eNodeB can release its resources related to the UE and can respond back to the MME. Routing Area Update procedures can be by the UE.

In action 22, for an emergency services session after handover is complete, the source MME or the MSC Server can send a Subscriber Location Report carrying the identity of the MSC Server to a GMLC associated with the source or target side, respectively, to support location continuity. Any configuration of the choice between a source MME versus MSC Server update to a GMLC needs to ensure that a single update occurs from one of these entities when the control plane location solution is used on the source and/or target sides. In case the MME determines that only the relocation of the voice bearer but not the relocation of one or more PS bearers succeeds, then the MME can proceeds with action 16 after receiving SRVCC PS to CS Response from the MSC Server in action 15 and both UE and MME continue the procedure.

Figure 5:
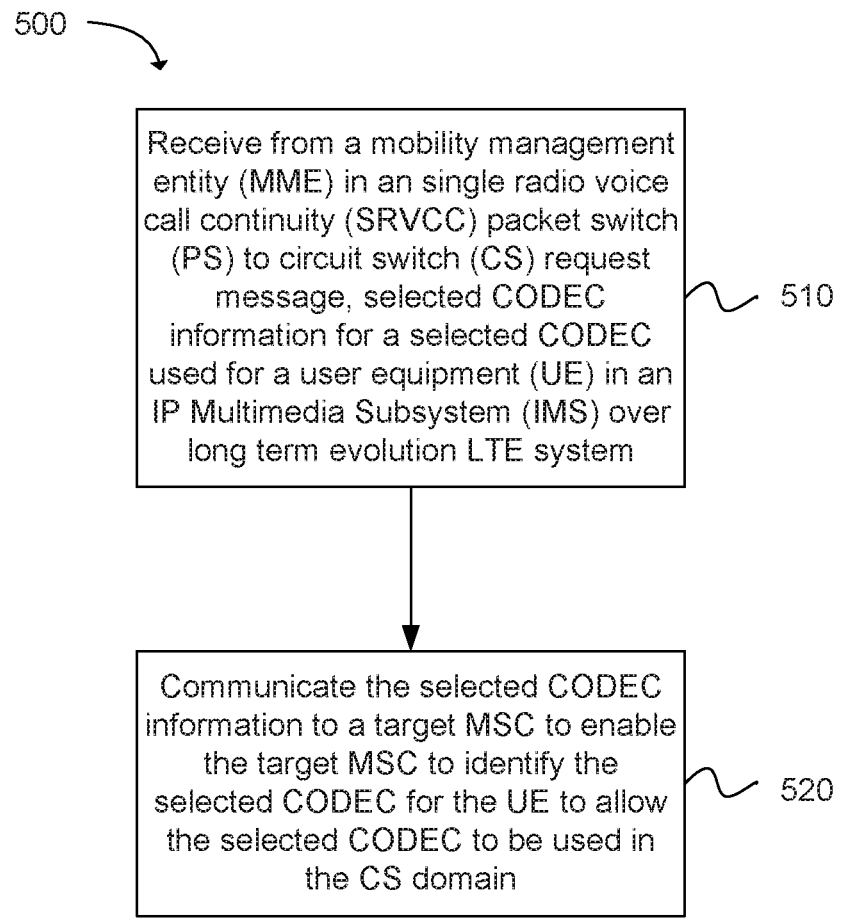
FIG. 5 depicts a flow chart of a method for transcoding avoidance during SRVCC in accordance with an example.

FIG. 5 depicts a flow chart of a method 500 for transcoding avoidance during SRVCC in accordance with an embodiment of the present disclosure. More specifically, FIG. 5 depicts functionality of a mobile switching center (MSC) server operable to perform for transcoding avoidance during SRVCC in accordance with an embodiment of the present disclosure. For example, the functionality of the MSC server can be implemented as the method 500 or the functionality can be executed as instructions on a machine, where the instructions are included on at least one computer readable medium or one non-transitory machine readable storage medium. The one or more processors can be configured to receive from a mobility management entity (MME) in an single radio voice call continuity (SRVCC) packet switch (PS) to circuit switched (CS) request message, selected CODEC information for a selected CODEC used for a user equipment (UE) in an internet protocol (IP) Multimedia Subsystem (IMS) over long term evolution LTE system, as in block 510. The one or more processors can be configured to communicate the selected CODEC information to a target MSC to enable the target MSC to identify the selected CODEC for the UE to allow the selected CODEC to be used in the CS domain, as in block 520. Also, as part of the method 500, either before, after, and/or in conjunction with blocks 510 and/or blocks 520, the one or more processors can be configured to determine if the MSC server supports the selected CODEC used by the IMS over the LTE system. The one or more processors can be configured to use the selected CODEC to be used in a circuit switch (CS) domain according to the selected CODEC previously used in the IMS over LTE system during the SRV. The one or more processors can be configured to communicate the selected CODEC information to the target MSC and a radio station subsystem/base station system k (RNS/BSS) to enable the RNS/BSS to send to an evolved NodeB (eNB) the selected CODEC information included in a radio resource control (RRC) container of a target to source container. The one or more processors can be configured to communicate the selected CODEC information to the target MSC and a radio station subsystem/base station system k (RNS/BSS) to enable the RNS/BSS to send to an evolved NodeB (eNB) the selected CODEC information included in a radio resource control (RRC) container of a target to source container. The one or more processors can be configured to notify an access transfer control function (ATCF) of the selected CODEC information during a session transfer operation. The one or more processors can be configured to convey the selected CODEC information to an access transfer gateway (ATGW).

Figure 6:
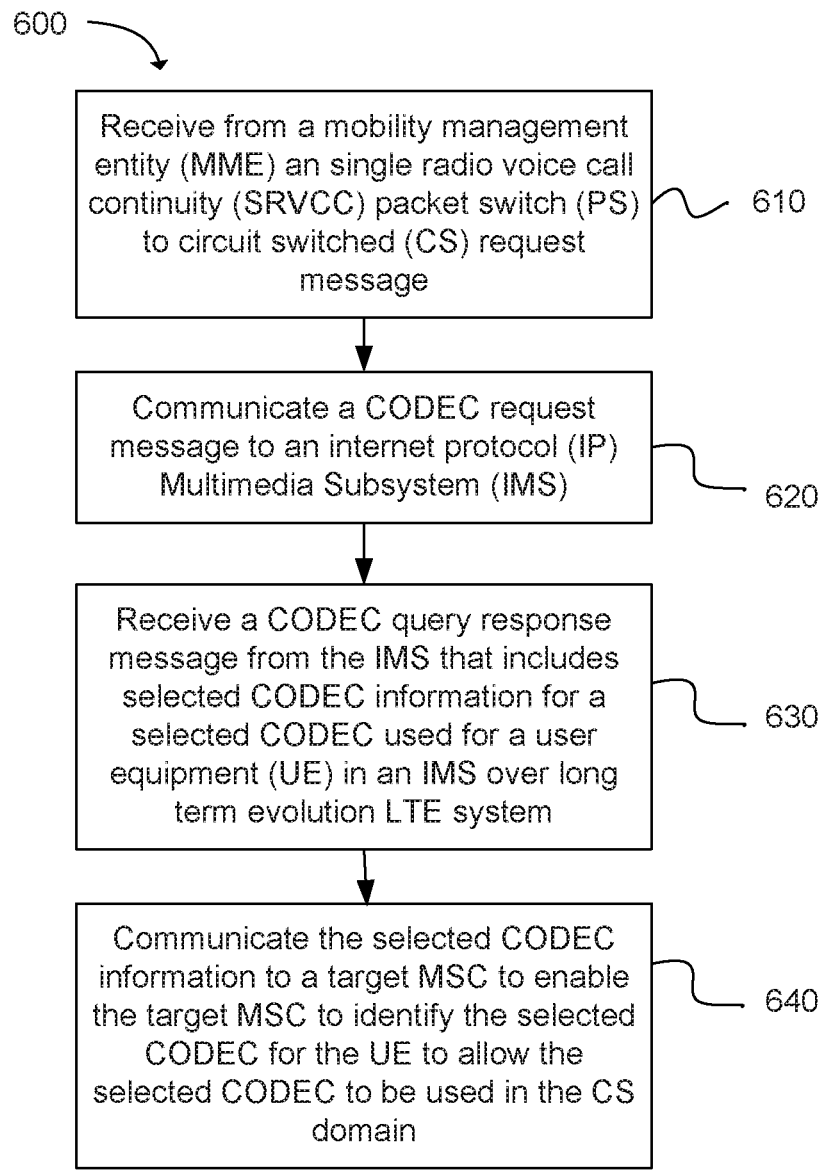
FIG. 6 depicts a flow chart of an additional method for transcoding avoidance during SRVCC in accordance with an example.

FIG. 6 depicts a flow chart of an additional method 600 for transcoding avoidance during SRVCC in accordance with an embodiment of the present disclosure. More specifically, FIG. 6 depicts functionality of a mobile switching center (MSC) server operable to perform for transcoding avoidance during SRVCC in accordance with an embodiment of the present disclosure. For example, the functionality of the MSC server can be implemented as the method 500 or the functionality can be executed as instructions on a machine, where the instructions are included on at least one computer readable medium or one non-transitory machine readable storage medium. One or more processors can be configured to receive from a mobility management entity (MME) an single radio voice call continuity (SRVCC) packet switch (PS) to circuit switched (CS) request message, as in block 610. The one or more processors can be configured to communicate a CODEC request message to an internet protocol (IP) Multimedia Subsystem (IMS), as in block 620. The one or more processors can be configured to receive a CODEC query response message from the IMS that includes selected CODEC information for a selected CODEC used by a user equipment (UE) in an IMS over long term evolution LTE system, as in block 630. The one or more processors can be configured to communicate the selected CODEC information to a target MSC to enable the target MSC to identify the selected CODEC for the UE to allow the selected CODEC to be used in the CS domain, as in block 640.

Also, as part of the method 600, either before, after, and/or in conjunction with blocks 610, 620, 630, and/or 640, the one or more processors can be configured to query the IMS for the selected CODEC information in the CODEC request message. The one or more processors can be configured to communicate the selected CODEC information to the target MSC and a radio station subsystem/base station system (RNS/BSS) to enable the RNS/BSS to send to an evolved NodeB (eNB) the selected CODEC information included in a radio resource control (RRC) container of the target to source container. The one or more processors can be configured to notify an access transfer control function (ATCF) of the selected CODEC information during a session transfer operation. The one or more processors can be configured to convey the selected CODEC information to an access transfer gateway (ATGW). The one or more processors can be configured to receive the CODEC query response message from the IMS that includes previously used CODEC information selected for a user equipment (UE) in the IMS over long term evolution LTE system. The one or more processors can be configured to indicate a priority indication in the SRVCC PS to CS request message for the target MSC to use the selected CODEC. The one or more processors can be configured to send a prepare handover request to the target MSC with the priority indication in the SRVCC PS to CS request message.

Figure 7:
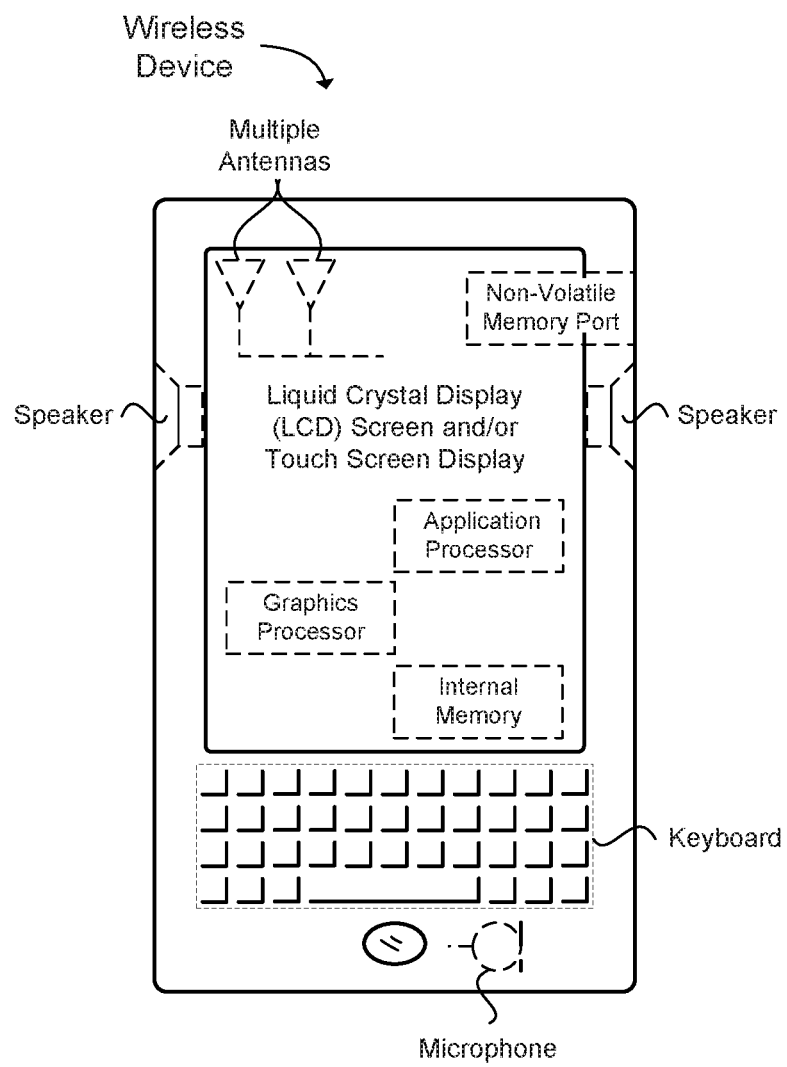
FIG. 7 illustrates a diagram of a wireless device (e.g., UE) in accordance with an example.

FIG. 7 provides an example illustration of the wireless device 700, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

EXAMPLES

Example 1 includes a mobile switching center (MSC) server operable for transcoding avoidance, the MSC server having circuitry configured to receive, from a mobility management entity (MME) in an single radio voice call continuity (SRVCC) packet switch (PS) to circuit switched (CS) request message, selected CODEC information for a selected CODEC used for a user equipment (UE) in an internet protocol (IP) Multimedia Subsystem (IMS) over long term evolution (LTE) system; and, communicate the selected CODEC information to a target MSC to enable the target MSC to identify the selected CODEC for the UE to allow the selected CODEC to be used in the CS domain.

Example 2 includes the MSC server of example 1, wherein the circuitry is further configured to include the selected CODEC information in a synchronization indicator.

Example 3 includes the MSC server of example 1, wherein the circuitry is further configured to determine if the MSC server supports the selected CODEC used by the IMS over the LTE system.

Example 4 includes the MSC server of example 1, wherein the circuitry is configured to use the selected CODEC to be used in a circuit switch (CS) domain according to the selected CODEC previously used in the IMS over LTE system during the SRVCC.

Example 5 includes the MSC server of example 1, wherein the circuitry is configured to communicate the selected CODEC information to the target MSC and a radio station subsystem/base station system k (RNS/BSS) to enable the RNS/BSS to send to an evolved NodeB (eNB) the selected CODEC information included in a radio resource control (RRC) container of a target to source container.

Example 6 includes the MSC server of example 1, wherein the circuitry is further configured to notify an access transfer control function (ATCF) of the selected CODEC information during a session transfer operation.

Example 7 includes the MSC server of example 1, wherein the circuitry is further configured to convey the selected CODEC information to an access transfer gateway (ATGW).

Example 8 includes a mobile switching center (MSC) server operable for transcoding avoidance, the MSC server having circuitry configured to receive, from a mobility management entity (MME), a single radio voice call continuity (SRVCC) packet switch (PS) to circuit switched (CS) request message; communicate a CODEC request message to an internet protocol (IP) Multimedia Subsystem (IMS); receive a CODEC query response message from the IMS that includes selected CODEC information for a selected CODEC used for a user equipment (UE) in an IMS over long term evolution LTE system; and communicate the selected CODEC information to a target MSC to enable the target MSC to identify the selected CODEC for the UE to allow the selected CODEC to be used in the CS domain.

Example 9 includes the MSC server of example 8, wherein the circuitry is further configured to query the IMS for the selected CODEC information in the CODEC request message.

Example 10 includes the MSC server of example 8, wherein the circuitry is further configured to communicate the selected CODEC information to the target MSC and a radio station subsystem/base station system (RNS/BSS) to enable the RNS/BSS to send to an evolved NodeB (eNB) the selected CODEC information included in a radio resource control (RRC) container of the target to source container.

Example 11 includes the MSC server of example 8, wherein the circuitry is further configured to notify an access transfer control function (ATCF) of the selected CODEC information during a session transfer operation.

Example 12 includes the MSC server of example 8, wherein the circuitry is further configured to convey the selected CODEC information to an access transfer gateway (ATGW).

Example 13 includes the MSC server of example 8, wherein the circuitry is further configured to receive the CODEC query response message from the IMS that includes previously used CODEC information selected for a user equipment (UE) in the IMS over long term evolution LTE system.

Example 14 includes the MSC server of example 8, wherein the circuitry is further configured to indicate a priority indication in the SRVCC PS to CS request message for the target MSC to use the selected CODEC.

Example 15 includes the MSC server of any of the examples 8-14, wherein the circuitry is further configured to send a prepare handover request to the target MSC with the priority indication in the SRVCC PS to CS request message.

Example 16 includes at least one non-transitory computer-readable storage medium, on a mobile switching center (MSC) having at least one processor, comprising instructions for transcoding avoidance, the instructions, when executed, cause the UE to: receive, from a mobility management entity (MME), a single radio voice call continuity (SRVCC) packet switch (PS) to circuit switched (CS) request message; communicate a CODEC request message to an internet protocol (IP) Multimedia Subsystem (IMS); receive a CODEC query response message from the IMS that includes selected CODEC information for a selected CODEC used for a user equipment (UE) in an IMS over long term evolution (LTE) system; and communicate the selected CODEC information to a target MSC to enable the target MSC to identify the selected CODEC for the UE to allow the selected CODEC to be used in the CS domain.

Example 17 includes the computer-readable storage medium of example 16, comprising further instructions that, when executed, cause the MSC server to query the IMS for the selected CODEC information in the CODEC request message with identification of the UE.

Example 18 includes the computer-readable storage medium of any of examples 16 or 17, comprising further instructions that, when executed, cause the MSC server to communicate the selected CODEC information to the target MSC and a radio station subsystem/base station system (RNS/BSS) to enable the RNS/BSS to send to an evolved NodeB (eNB) the selected CODEC information included in a radio resource control (RRC) container of the target to source container.

Example 19 includes the computer-readable storage medium of any of examples 16-18, comprising further instructions that, when executed, cause the MSC server to send a prepare handover request to the target MSC with a priority indication in the SRVCC PS to CS request message.

Example 20 includes the computer-readable storage medium of any of examples 16-19, comprising further instructions that, when executed, cause the MSC server to convey the selected CODEC information to an access transfer gateway (ATGW).

Example 21 includes a mobile switching center (MSC) server operable for transcoding avoidance, the MSC server having circuitry configured to: receive, from a mobility management entity (MME) in an single radio voice call continuity (SRVCC) packet switch (PS) to circuit switched (CS) request message, selected CODEC information for a selected CODEC used for a user equipment (UE) in an internet protocol (IP) Multimedia Subsystem (IMS) over long term evolution (LTE) system; and communicate the selected CODEC information to a target MSC to enable the target MSC to identify the selected CODEC for the UE to allow the selected CODEC to be used in the CS domain.

Example 22 includes the MSC server of example 21, wherein the circuitry is further configured to: include the selected CODEC information in a synchronization indicator, determine if the MSC server supports the selected CODEC used by the IMS over the LTE system, or use the selected CODEC to be used in a circuit switch (CS) domain according to the selected CODEC previously used in the IMS over LTE system during the SRVCC.

Example 23 includes the MSC server of any of examples 21 or 22, wherein the circuitry is configured to communicate the selected CODEC information to the target MSC and a radio station subsystem/base station system k (RNS/BSS) to enable the RNS/BSS to send to an evolved NodeB (eNB) the selected CODEC information included in a radio resource control (RRC) container of a target to source container.

Example 24 includes the MSC server of any of examples 21 to 23, wherein the circuitry is further configured to notify an access transfer control function (ATCF) of the selected CODEC information during a session transfer operation.

Example 25 includes the MSC server of any of examples 21 to 24, wherein the circuitry is further configured to convey the selected CODEC information to an access transfer gateway (ATGW).

Example 26 includes a mobile switching center (MSC) server operable for transcoding avoidance, the MSC server having circuitry configured to: receive, from a mobility management entity (MME), a single radio voice call continuity (SRVCC) packet switch (PS) to circuit switched (CS) request message; communicate a CODEC request message to an internet protocol (IP) Multimedia Subsystem (IMS); receive a CODEC query response message from the IMS that includes selected CODEC information for a selected CODEC used for a user equipment (UE) in an IMS over long term evolution LTE system; and communicate the selected CODEC information to a target MSC to enable the target MSC to identify the selected CODEC for the UE to allow the selected CODEC to be used in the CS domain.

Example 27 includes the MSC server of example 26, wherein the circuitry is further configured to: query the IMS for the selected CODEC information in the CODEC request message, and communicate the selected CODEC information to the target MSC and a radio station subsystem/base station system (RNS/BSS) to enable the RNS/BSS to send to an evolved NodeB (eNB) the selected CODEC information included in a radio resource control (RRC) container of the target to source container.

Example 28 includes the MSC server of any of examples 26 or 27, wherein the circuitry is further configured to notify an access transfer control function (ATCF) of the selected CODEC information during a session transfer operation.

Example 29 includes the MSC server of any of examples 26-28, wherein the circuitry is further configured to convey the selected CODEC information to an access transfer gateway (ATGW).

Example 30 includes the MSC server of any of examples 26-29, wherein the circuitry is further configured to receive the CODEC query response message from the IMS that includes previously used CODEC information selected for a user equipment (UE) in the IMS over long term evolution LTE system.

Example 31 includes the MSC server of any of examples 26-30, wherein the circuitry is further configured to indicate a priority indication in the SRVCC PS to CS request message for the target MSC to use the selected CODEC.

Example 32 includes the MSC server of example 31, wherein the circuitry is further configured to send a prepare handover request to the target MSC with the priority indication in the SRVCC PS to CS request message.

Example 33 includes least one non-transitory computer-readable storage medium, on a mobile switching center (MSC) having at least one processor, comprising instructions for transcoding avoidance, the instructions, when executed, cause the UE to: receive, from a mobility management entity (MME), a single radio voice call continuity (SRVCC) packet switch (PS) to circuit switched (CS) request message; communicate a CODEC request message to an internet protocol (IP) Multimedia Subsystem (IMS); receive a CODEC query response message from the IMS that includes selected CODEC information for a selected CODEC used for a user equipment (UE) in an IMS over long term evolution (LTE) system; and communicate the selected CODEC information to a target MSC to enable the target MSC to identify the selected CODEC for the UE to allow the selected CODEC to be used in the CS domain.

Example 34 includes the computer-readable storage medium of claim 33, comprising further instructions that, when executed, cause the MSC server to query the IMS for the selected CODEC information in the CODEC request message with identification of the UE.

Example 35 includes the computer-readable storage medium of claim 33 or 34, comprising further instructions that, when executed, cause the MSC server to communicate the selected CODEC information to the target MSC and a radio station subsystem/base station system (RNS/BSS) to enable the RNS/BSS to send to an evolved NodeB (eNB)the selected CODEC information included in a radio resource control (RRC) container of the target to source container, send a prepare handover request to the target MSC with a priority indication in the SRVCC PS to CS request message, or convey the selected CODEC information to an access transfer gateway (ATGW).

Example 36 includes a device for transcoding avoidance, the device comprising means for receiving, from a mobility management entity (MME), a single radio voice call continuity (SRVCC) packet switch (PS) to circuit switched (CS) request message; means for communicating a CODEC request message to an internet protocol (IP) Multimedia Subsystem (IMS); means for receiving a CODEC query response message from the IMS that includes selected CODEC information for a selected CODEC used for a user equipment (UE) in an IMS over long term evolution (LTE) system; and means for communicating the selected CODEC information to a target MSC to enable the target MSC to identify the selected CODEC for the UE to allow the selected CODEC to be used in the CS domain.

Example 37 includes the device of example 36, further comprising means for querying the IMS for the selected CODEC information in the CODEC request message with identification of the UE.

Example 38 includes the device of any of examples 36 or 37, further comprising means for communicating the selected CODEC information to the target MSC and a radio station subsystem/base station system (RNS/BSS) to enable the RNS/BSS to send to an evolved NodeB (eNB) the selected CODEC information included in a radio resource control (RRC) container of the target to source container.

Example 39 includes the device of any of examples 36-38, further comprising means for sending a prepare handover request to the target MSC with a priority indication in the SRVCC PS to CS request message.

Example 40 includes the device of any of examples 36-39, further comprising means for conveying the selected CODEC information to an access transfer gateway (ATGW).

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present disclosure. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present disclosure can be referred to herein along with alternatives for the various components thereof. It is understood that such embodiments, examples, and alternatives are not to be construed as defacto equivalents of one another, but are to be considered as separate and autonomous representations of the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the disclosure. One skilled in the relevant art can recognize, however, that the disclosure can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of the present disclosure in one or more particular applications, it can be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. An apparatus of a mobile switching center (MSC) server configured to perform a single radio voice call continuity (SRVCC) procedure, the apparatus comprising:
   memory; and
   one or more processors configured to:
   decode an SRVCC packet switch (PS) to circuit switched (CS) request message received at the MSC server when a PS-CS handover procedure is triggered;
   encode a codec inquiry request message for transmission from the MSC server, wherein the codec inquiry request message includes a session transfer number-single radio (STN-SR), a correlation mobile station international subscriber directory number (C-MSISDN), and supported codec information;
   decode a codec inquiry response message received at the MSC server, wherein the codec inquiry response message includes selected codec information for a selected codec used for a user equipment (UE) in an internet protocol (IP) Multimedia Subsystem (IMS) system; and
   continue, at the MSC server, to perform the SRVCC procedure based in part on the selected codec information.

2. The apparatus of claim 1, further comprising a transceiver configured to:
   receive the SRVCC PS to CS request message
   transmit the codec inquiry request message; and
   receive the codec inquiry response message.

3. The apparatus of claim 1, wherein the codec inquiry request message is associated with an access transfer control function (ATCF).

4. The apparatus of claim 1, wherein the one or more processors are configured to perform a codec inquiry prior to a session transfer during the SRVCC procedure.

5. The apparatus of claim 1, wherein the one or more processors are configured to encode the selected codec information for transmission to a target radio access network (RAN) to enable the selected codec information to be used for the UE in the IMS sub system.

6. At least one non-transitory machine readable storage medium having instructions embodied thereon for transcoding avoidance, the instructions when executed by one or more processors perform the following:

decoding, at a mobile switching center (MSC) server, a single radio voice call continuity (SRVCC) packet switch (PS) to circuit switched (CS) request message received from a mobility management entity (MME);

encoding, at the MSC server, a codec request message for transmission to an internet protocol (IP) Multimedia Subsystem (IMS); and decoding, at the MSC server, a codec query response message received from the IMS that includes selected codec information for a selected codec used for a user equipment (UE) in an IMS over long term evolution LTE system.

7. The at least one non-transitory machine readable storage medium of claim 6, further comprising instructions when executed perform the following: encoding the selected codec information for transmission to a target MSC to enable the target MSC to identify the selected codec for the UE to allow the selected codec to be used in the CS domain.

8. The at least one non-transitory machine readable storage medium of claim 6, further comprising instructions when executed perform the following: querying the IMS for the selected codec information in the codec request message.

9. The at least one non-transitory machine readable storage medium of claim 6, further comprising instructions when executed perform the following: encoding the selected codec information for transmission to a target MSC and a radio station subsystem/base station system (RNS/BSS) to enable the RNS/BSS to send to an evolved NodeB (eNB) the selected codec information included in a radio resource control (RRC) container of the target to source container.

10. The at least one non-transitory machine readable storage medium of claim 6, further comprising instructions when executed perform the following: notifying an access transfer control function (ATCF) of the selected codec information during a session transfer operation.

11. The at least one non-transitory machine readable storage medium of claim 6, further comprising instructions when executed perform the following: encoding the selected codec information for transmission to an access transfer gateway (ATGW).

12. The at least one non-transitory machine readable storage medium of claim 6, further comprising instructions when executed perform the following: decoding the codec query response message received from the IMS that includes previously used codec information selected for a user equipment (UE) in the IMS over long term evolution LTE system.

13. The at least one non-transitory machine readable storage medium of claim 6, further comprising instructions when executed perform the following: indicating a priority indication in the SRVCC PS to CS request message for a target MSC to use the selected codec.

14. The at least one non-transitory machine readable storage medium of claim 13, further comprising instructions when executed perform the following: encoding a prepare handover request for transmission to the target MSC with the priority indication in the SRVCC PS to CS request message.

15. The at least one non-transitory machine readable storage medium of claim 6, further comprising instructions when executed perform the following: including the selected codec information in a synchronization indicator.

16. The at least one non-transitory machine readable storage medium of claim 6, further comprising instructions when executed perform the following: determining when the MSC server supports the selected codec used by the IMS over the LTE system.

17. At least one non-transitory machine readable storage medium having instructions embodied thereon for performing a single radio voice call continuity (SRVCC) procedure using a mobile switching center (MSC) server, the instructions when executed by one or more processors perform the following:

decoding an SRVCC packet switch (PS) to circuit switched (CS) request message received at the MSC server when a PS-CS handover procedure is triggered;

encoding a codec inquiry request message for transmission from the MSC server, wherein the codec inquiry request message includes a session transfer number-single radio (STN-SR), a correlation mobile station international subscriber directory number (C-MSISDN), and supported codec information;

decoding a codec inquiry response message received at the MSC server, wherein the codec inquiry response message includes selected codec information for a selected codec used for a user equipment (UE) in an internet protocol (IP) Multimedia Subsystem (IMS) system; and continuing, at the MSC server, to perform the SRVCC procedure based in part on the selected codec information.

18. The at least one non-transitory machine readable storage medium of claim 17, wherein the codec inquiry request message is associated with an access transfer control function (ATCF).

19. The at least one non-transitory machine readable storage medium of claim 17, further comprising instructions when executed perform the following: performing a codec inquiry prior to a session transfer during the SRVCC procedure.

20. The at least one non-transitory machine readable storage medium of claim 17, further comprising instructions when executed perform the following: encoding the selected codec information for transmission to a target radio access network (RAN) to enable the selected codec information to be used for the UE in the IMS subsystem.

\* \* \* \* \*